United States Patent [19]

Zarzycki et al.

[11] 4,432,956

[45] Feb. 21, 1984

[54] PREPARATION OF MONOLITHIC SILICA AEROGELS, THE AEROGELS THUS OBTAINED AND THEIR USE FOR THE PREPARATION OF SILICA GLASS ARTICLES AND OF HEAT-INSULATING MATERIALS

[75] Inventors: Jerzy W. Zarzycki, Saint-Clement la Riviere, France; Michel Prassas, Gainesville, Fla.; Jean E. H. Phalippou, Montferrier, France

[73] Assignee: Corning France, Avon, France

[21] Appl. No.: 384,072

[22] Filed: Jun. 1, 1982

[30] Foreign Application Priority Data

Jun. 4, 1981 [FR] France ............................ 81 11089

[51] Int. Cl.$^3$ .................... C01B 33/16; C01B 33/12
[52] U.S. Cl. ................................ 423/338; 423/335; 501/12
[58] Field of Search ............ 423/338, 335, 336, 325; 507/12

[56] References Cited

U.S. PATENT DOCUMENTS 2,093,454  9/1937  Kistler ............................. 423/338
4,327,065  4/1982  von Dardel et al. ............. 423/338

OTHER PUBLICATIONS

B. E. Yoldas, J. Material Science, Dec. 1977, pp. 1203–1208.
Insulation Journal, vol. 24, No. 12, Dec. 1980, p. 1.
Kingery et al., *Introduction to Ceramics*, 2nd Ed., Wiley–Interscience, New York, 1976, pp. 484–486.

*Primary Examiner*—Helen M. McCarthy
*Assistant Examiner*—Steven Capella
*Attorney, Agent, or Firm*—Gordon W. Hueschen

[57] ABSTRACT

The invention relates to a process for the preparation of monolithic silica aerogels by drying silica gels under hypercritical conditions, which is characterized by the absence of washing of the silica gel, a high heating rate in the autoclave and purging of the autoclave after substantial removal of the solvent. Other preferred conditions are the use of an amount of water not exceeding 1.5 times the stoichiometric amount for the hydrolysis, hypercritical conditions corresponding to a temperature of 265°–275° C. and to a pressure of 150–200 bars, and so on. Use of the aerogels for the preparation of silica glass bodies or articles and of heat-insulating materials.

10 Claims, No Drawings

PREPARATION OF MONOLITHIC SILICA AEROGELS, THE AEROGELS THUS OBTAINED AND THEIR USE FOR THE PREPARATION OF SILICA GLASS ARTICLES AND OF HEAT-INSULATING MATERIALS

The invention relates to the preparation of monolithic areogels based on silica, the aerogels thus obtained and their use for the production of silica glass articles.

It is already known to prepare silica aerogels by drying silica alcogels under hypercritical conditions, the alcogel being prepared by replacing, with an alcohol, such as methanol, the water contained in a hydrogel washed beforehand (see French Patent No. 1,544,835).

As an improvement to the above process, it has been proposed to dissolve, in an alcohol, such as methanol, a hydrolyzable silicon compound, such as methyl orthosilicate, which gives volatile products on hydrolysis, to add water in order to hydrolyze the said compound, and then to carry out drying under hypercritical conditions (see French Patent No. 1,568,817).

French Patent No. 1,587,066 describes the preparation of aerogels of mineral oxides, for example oxides of Zr, Ti or Al, by the hydrolysis of a metal alcoholate in a non-homogeneous medium, followed by drying under hypercritical conditions.

Furthermore, French Patent No. 2,050,725 describes the preparation of aerogels of mixed mineral oxides by the simultaneous hydrolysis of at least two hydrolyzable metal derivatives in an organic medium, and then by the removal of the solvent under hypercritical conditions. However, the said patent does not specifically describe mixed aerogels containing silica as a constituent.

The three patents mentioned above relate to the preparation of aerogels of mineral oxides from compositions comprising a hydrolyzable organometallic compound and a solvent containing a relatively low proportion of a metal derivative, which does not exceed 30% by weight, the majority of the examples given using a proportion of hydrolyzable metal derivatives of at most 20% by weight.

These patents are not very explicit as regards the form in which the aerogels are obtained. Only French Patent 1,587,066 indicates that the aerogels obtained are in an extremely finely divided state. In any case, these earlier patents never refer to the preparation of a monolithic aerogel of substantial size and free of fissures and cracks.

More recently, the European Patent Application published under No. 18,955 has described a process for the preparation of a silica aerogel in the form of a block free of cracks, which is preferably transparent, by drying, under hypercritical conditions, a silica alcogel prepared by the hydrolysis of a silicic acid ester dissolved in a solvent, wherein the hydrolysis is carried out at a temperature not exceeding ambient temperature, the resulting silica gel is aged and washed with solvent, and the hypercritical drying treatment lasts at least 24 hours. This process is very slow to carry out, the ageing lasting 2 to 26 days, preferably 10 days, the washing operation also lasting several days, and the heating of the alcogel in an autoclave, in order to achieve the hypercritical conditions, being carried out very gradually at a rate not exceeding 25° C./hour, preferably of 10° to 15° C./hour. This is therefore a process which is poorly suited to the realities of industry and to economic requirements. Moreover, because of the need for a washing step, this process is not suitable for the production of mixed aerogels.

The object of the invention is to provide a new process for the preparation of monolithic silica aerogels free of cracks and fissures, which is carried out more simply and more rapidly than the process described in the abovementioned European Patent Application No. 18,955.

More particularly, the invention relates to a process for the preparation of a silica aerogel which is monolithic and free of fissures and cracks and has at least one of its dimensions greater than 10 cm, in which process water and a non-aqueous solvent are added to a hydrolyzable silicon compound in such amounts that the resultant solution is homogeneous, the amount of water being sufficient to hydrolyze and polycondense the said compound to form a gel, the silicon compound being present in an amount of at least 40% by volume, relative to the total of the silicon compound plus the non-aqueous solvent, the whole, placed in a container of the desired shape, is subjected, in an autoclave containing an additional amount of the non-aqueous solvent used to form the solution, to temperature and pressure conditions which are such that the critical point of the solvent of the solution remaining after gelling is exceeded, without the liquid/vapor equilibrium curve of the solvent being broken at any time, and the solvent and any residual water present are then removed in order to obtain a silica aerogel, wherein:

(a) the autoclave treatment is carried out without the prior removal of water from the gel;
(b) the autoclave is heated at a rate of at least 50° C./hour to a temperature above the critical temperature, and once the desired maximum temperature has been reached, the solvent is removed under substantially isothermal conditions, over a period of at most 5 hours; and
(c) after the autoclave has returned to atmospheric pressure, the residual solvent is purged from the autoclave, the heating of the autoclave is stopped and the aerogel is withdrawn from the autoclave after cooling.

The aerogel can be obtained in the form of a monolithic body free of cracks and fissures, at least one of the dimensions of which exceeds 10 cm in a reproducible manner.

Preferably, the silicon compound is present in an amount of 50 to 70% by volume.

The invention also relates to the use of these monolithic silica aerogels for the preparation of silica glass and of heat-insulating expanded materials.

The hydrolyzable silicon compound can be, in particular, a silicon alcoholate derived from a lower alcohol. Methyl orthosilicate, $Si(OCH_3)_4$, also referred to as tetramethoxysilane, is very particularly preferred from a practical point of view. It is also possible to use tetraethoxysilane.

The non-aqueous solvent will generally consist of the alcohol corresponding to the alcoholate used. It is very particularly preferred to use methanol with the preferred tetramethoxysilane. With tetraethoxysilane, ethanol will preferably be used.

The expression "silica aerogel" is understood as denoting either aerogels containing silica as the only mineral oxide, or aerogels containing, in addition to silica as the main mineral oxide, a minor proportion of at least one other mineral oxide. Examples of such other mineral oxides are $B_2O_3$, $TiO_2$ and $Al_2O_3$. $B_2O_3$, $TiO_2$ and $Al_2O_3$ can be obtained, for example, by the hydrolysis of alcoholates of B, Ti or Al, such as $B(OCH_3)_3$, $Ti(OC_2H_5)_4$ and Al-(sec.-butoxide)$_3$.

The operations of dissolution, hydrolysis and polycondensation can be carried out in various ways: it is possible, for example, to prepare a gel by agitating $Si(OCH_3)_4$ in methanol and then by hydrolyzing the solution obtained by adding water and agitating at ambient temperature for about 15 minutes to 1 hour. In the case where the $Si(OCH_3)_4$/methanol/water mixture shows immiscibility (phase separation), which can happen for gelling mixtures containing a high proportion of $Si(OCH_3)_4$, it is possible to heat the gellable mixture, for example at 40°–60° C., during the agitation, in order to overcome the immiscibility and to obtain the required homogeneous character.

According to a variant, instead of using water for the hydrolysis, a dilute solution of ammonia, for example a 0.001 to 0.01 N solution, is employed in order to facilitate the said hydrolysis.

Before the introduction of the gelling (or already gelled) mixture into the autoclave, it is sometimes useful, but not essential, to allow it to age for periods ranging from 1 to 1,000 hours, preferably of at least 20 hours. This ageing, which has the effect of making the silica lattice rigid and thus of facilitating the production of monolithic aerogels, can be carried out at a temperature higher or equal to the ambient temperature, the gelling or already gelled mixture being placed in a leaktight container under the autogeneous pressure of alcohol vapor. The gel obtained can remain indefinitely in its monolithic form if the gel is stored under alcohol pressure. Ageing is especially useful for the preparation of mixed aerogels.

The ageing operation can also be carried out inside the autoclave. It is possible, for example, to make provision for temperature plateaux between 40° and 120° C. for variable periods, before continuing the heating of the autoclave for the purpose of drying the gel.

The drying of the gel is carried out in an autoclave under conditions which are hypercritical for the solvent present. This solvent consists not only of the non-aqueous solvent used (most frequently methanol), but also of the residual water present. The critical conditions for methanol are $T_C=240°$ C. and $P_C=79.7$ bars. In practice, the temperature at which the solvent is removed is a function of the percentage of water relative to the total non-aqueous solvent present in the autoclave at the time of the removal. This total non-aqueous solvent is equal to the sum of the additional solvent introduced into the autoclave, plus the solvent contained in the gel, plus the solvent produced during the hydrolysis and the polycondensation. The removal temperature is equal to about 265° C. when the percentage of water is equal to 15% by weight, relative to the total methanol.

In practice, it has been found that a temperature range from 265° to 275° C. is suitable in the majority of cases if the non-aqueous solvent employed is methanol. These temperatures correspond to pressures of the order of 180 to 200 bars. Under these conditions, the solvent is removed slowly, in a substantially isothermal manner. The removal of the solvent commonly takes from 2 to 5 hours.

The heating of the autoclave can be carried out at a rate of at least 50° C./hour, without causing cracks. A rate of the order of 100° C./hour is preferred.

In order to be able to obtain monolithic bodies of large size and free of cracks or fissures, the Applicants have found that several parameters are important:

(a) The proportion of silicon compound (tetramethoxysilane) in the starting solution must be at least 40% by volume, because, below a proportion of 40% by volume, the preparation of monolithic bodies of large size and free of cracks or fissures proves difficult and, furthermore, the bodies obtained are not suitable for the production of silica glass articles.

Preferably, the proportion of silicon compound is between 50 and 70% by volume, because it is within this range that the preparation of the monoliths is easiest and that the monoliths are most suitable for the production of silica glass articles. Above 70% by volume, the problems of immiscibility become difficult to overcome.

(b) To be certain of not breaking the liquid/vapor equilibrium curve of the solvent during the setting-up of the hypercritical conditions, care must be taken to ensure that the volume per unit mass, $V_M$, defined by the relationship:

$$V_M = \frac{\text{Useful internal volume of the autoclave under the critical conditions}}{\text{Mass of additional solvent + mass of solvent in the gel}}$$

is less than 6.5 cm$^3$g$^{-1}$, in the case of a simple silica gel and of the tetramethoxysilane/methanol system. Preferably, $V_M$ is between 3 and 4 cm$^3$g$^{-1}$.

(c) Another important parameter to take into consideration for the production of aerogel monoliths free of fissures or cracks, is the ratio r of the number of moles of water to the number of moles of silicon compound.

As the hydrolysis reaction is: $Si(OCH_3)_4+4H_2O \rightarrow Si(OH)_4+4CH_3OH$ (1), the amount of water is stoichiometric when $r=4$. Experiment has shown that r must not exceed certain limits, which are a function of the proportion of silicon compound in the starting solution, if it is desired to carry out the reaction under the easiest conditions. A detailed discussion of the influence of the ratio r is given in Example 6. For a preferred proportion of the silicon compound of between 50 and 70%, a ratio r within the range from 4 to 5 gives good results.

After the solvent has been removed and the autoclave has returned to atmospheric pressure, the autoclave is purged of any residual solvent, for example with a dry inert gas, such as argon, for a brief period, for example for 15 minutes. The heating of the oven is then stopped and the aerogel is withdrawn from the autoclave after the autoclave has returned to ambient temperature. Care should be taken for avoiding any condensation of water from ambient air. This can be achieved, for example, by isolating the autoclave from the atmosphere or by sweeping it with a dry gas, such as dry air, during the cooling.

With an autoclave having a capacity of 1 liter, the Applicants have been able to obtain monolithic silica aerogels of cylindrical shape, having a diameter of 28 mm and a height of 230 mm.

These aerogels have a fairly expanded texture, a specific surface area reaching several hundred m$^2$/g (typically of the order of 250 to 450 m$^2$/g), a high pore volume (typically of 2.5 to 5 cm$^3$/g) and a very low density (typically of 0.18 to 0.35 g/cm$^3$), which is a function of the concentration of silicon compound in the gelling mixture. The chemical composition of these aerogels corresponds to a formula $SiO_x$—$(OH)_y(OR)_z$.

The carbon content of the aerogels is of the order of a few percent, typically of the order of 4 to 5% by weight. The aerogels obtained have a hydrophobic character due to the presence of Si—O—R groups, in which R is an organic radical.

These monolithic silica aerogels, which are free of fissures or cracks, have proved particularly advantageous for the manufacture of silica glass articles. In fact, it suffices to consolidate these monolithic aerogels by heating them gradually up to a temperature within the range from 1,120° to 1,300° C., if appropriate with the observation of a plateau (plateaux) between 300° and 950° C. During the consolidation, the aerogels become compact in an isotropic manner. During the heating, they become completely transparent at about 1,120° C., at which they already have a density which is 99.7% of the density (2.20 g/cm$^3$) of the vitreous silica obtained by the conventional method, and then reach the density of vitreous silica on continuing the heating to a higher temperature. The total densifying temperature varies according to the residual proportion of —OH groups and the degree of porosity of the aerogel, which is a function of the proportion of silicon compound in the starting solution, the porosity being the greater, the lower this proportion, as can be understood. No substantial shrinkage of the gel is observed below 950° C.

The aerogels of the invention thus make it possible to produce silica glass bodies or articles under particularly economic conditions. In fact, it suffices to carry out the consolidation heating at a temperature within the range from 1,120° to 1,300° C., preferably from 1,120° to 1,250° C., instead of having to melt the silica, which requires temperatures of the order of 2,000° C. Care must be taken not to exceed a temperature of 1,300° C. during the consolidation, so as not to cause crystallization of the silica glass. It is for this reason that it is impossible, in practice, to use aerogel monoliths prepared from a starting solution containing less than 40% by volume of silicon compound, because these monoliths are extremely porous and require higher temperatures, in excess of 1,300° C., for their consolidation, with the result that the crystalline glass obtained is of no value.

As the aerogels of the invention contain organic —OR groups and a relatively large amount (typically 6 to 10% by weight) of water (again mainly in the form of —OH groups), it is advantageous to carry out the heating in several steps, in order to remove these organic groups and this water as completely as possible during the consolidation treatment. In particular, the —OH groups which might be trapped in the final silica glass could affect a large number of properties of the said glass, if the residual water content were too large. It is therefore necessary for the consolidation heating to be carried out slowly (for example 5 to 48 hours), preferably with a holding time of 2 to 15 hours within the temperature range from 300° to 650° C., under an atmosphere of oxygen or air, in order to remove the organic groups, and, if appropriate, with the observation of at least one plateau for a few hours, for example 2 to 15 hours, within the temperature range from 800° to 950° C., in order to remove as much water as possible, the latter temperature corresponding to the start of viscous flow of the aerogel.

Other means could be employed to reduce the proportion of —OH groups; by way of examples, there may be mentioned the placing of the aerogels under a secondary vacuum before consolidating them, or alternatively the use of a drying atmosphere (chlorine or the like) during the consolidation.

The silica glasses produced can be worked with a blowpipe if the proportion of —OH groups therein does not exceed about 1,500 ppm.

The silica glasses produced from the aerogels of the invention have a very good optical quality and, macroscopically, do not differ in any respect from a silica glass manufactured by the conventional method.

It is possible, for example, to produce, from a cylinder of monolithic aerogel, a cylinder of silica glass which is obviously of a smaller size than the starting aerogel, and from which lenses, for example, can be produced.

It would also be possible to form coatings of silica glass on substrates.

Another use of the aerogel monoliths of the invention is the preparation of heat-insulating materials. For this purpose, it suffices to subject the monolith to rapid heating to a high temperature (about 1,200°–1,300° C.) in order to close the surface porosity of the monolith prematurely and to trap the oxidation products of the organic groups, which act as a pore-forming agent. It is thus possible to obtain an expanded material having a leaktight vitrified surface and a porous core, the density of which can vary between 0.3 and 2.2.

The non-limiting examples which follow are given in order to illustrate the invention.

EXAMPLE 1

Preparation of a monolithic silica aerogel in a neutral medium 25.4 cm$^3$ of pure methanol (CH$_3$OH) are added to 38 cm$^3$ of tetramethoxysilane (Si(OCH$_3$)$_4$). The mixture is agitated for 10 minutes. The amounts used correspond to 60% by volume of Si(OCH$_3$)$_4$ in CH$_3$OH.

The hydrolysis of the tetramethoxysilane is carried out, with continuous agitation, by adding 21.6 cm$^3$ of distilled water (an amount slightly greater than the stoichiometric amount according to reaction (1)).

$$Si(OCH_3)_4 + 4H_2O \rightarrow Si(OH)_4 + 4CH_3OH \tag{1}$$

The duration of the hydrolysis is 15 minutes. The solution obtained is transferred into a Pyrex ® glass tube ($\phi$: 21.5 mm; h: 250 mm) and placed in an autoclave having a total capacity of 1,000 cm$^3$. 250 cm$^3$ of pure methanol are also introduced into the autoclave so as to be able to achieve the required hypercritical conditions (V$_M$=3.93 cm$^3$g$^{-1}$; % H$_2$O=8.10).

The autoclave is heated at a rate of 100° C./hour. When the temperature reaches 270° C., the solvent is slowly removed. The duration of the removal is 2 hours. When the removal has ended, the autoclave is purged several times with a dry gas (argon) for 15 minutes.

The silica aerogel is withdrawn after the autoclave has cooled to ambient temperature.

The aerogel is in the form of a slightly opaque, monolithic cylindrical bar.

A silica aerogel is prepared in the same manner, except that the starting amounts correspond to 50% by volume of Si(OCH$_3$)$_4$ in CH$_3$OH. A slightly opaque, monolithic cylindrical bar of aerogel is again obtained.

These two aerogels are given the designations A60 25 and A50 respectively.

EXAMPLE 2

Preparation of a monolithic silica aerogel in a neutral medium 15 cc of pure methanol are added to 35.1 cm$^3$ of tetramethoxysilane. The mixture is agitated for 10 minutes. The amounts used correspond to 70% by volume of Si(OCH$_3$)$_4$ in CH$_3$OH. The hydrolysis of the tetramethoxysilane is carried out, with continuous agitation, by adding 19.9 cm$^3$ of distilled water (an amount slightly greater than the stoichiometric amount according to reaction (1)). When all the water has been added to the solution of Si(OCH$_3$)$_4$ in CH$_3$OH, two immiscible phases are formed. The miscibility of the mixture is achieved by agitation and heating for about 1 hour at 30°–40° C. After the mixture has become homogeneous, the procedure is the same as in Example 1. Th aerogel obtained is monolithic and slightly transparent. It is given the designation A70.

The Table below summarizes the properties of the aerogels of Examples 1 and 2.

TABLE

Textural properties of the MG for different % by volume of Si(OCH$_3$)$_4$

| Gel | Density Pa (gcm$^{-3}$) | Specific surface area Sp (m$^2$g$^{-1}$) | Specific volume Vp (cm$^3$g$^{-1}$) | Porosity P (%) | $\bar{R}_{po}$(Å) | $\bar{R}_{pa}$(Å) |
|---|---|---|---|---|---|---|
| A50 | 0.194 | 358 | 4.7 | 91.3 | 262 | 38 |
| A60 | 0.255 | 369 | 3.4 | 88.5 | 184 | 37 |
| A70 | 0.280 | 384 | 3.1 | 87.4 | 161 | 35 |

EXAMPLE 3

Preparation of a monolithic silica aerogel in an ammoniacal medium

The procedure described in Example 1 is followed, except that the hydrolysis of the mixture is carried out with a 0.01 N solution of NH$_4$OH. Moreover, as the gelling is accelerated at ambient temperature by the addition of ammonia, the mixing and the hydrolysis are carried out at 0° C.

The following steps are identical to those described in Example 1. The gel obtained is monolithic and transparent. Its properties are as follows:

| Pa(gcm$^{-3}$) | Sp(m$^2$g$^{-1}$) | Vp(cm$^3$g$^{-1}$) | P (%) | $\bar{R}_{po}$(Å) | $\bar{R}_{pa}$(Å) |
|---|---|---|---|---|---|
| 0.232 | 320 | 3.86 | 89.5 | 241 | 42 |

EXAMPLE 4

This example is given in order to illustrate the critical character of the condition concerning the volume per unit mass, V$_M$.

A gelling mixture is prepared as in Example 1 and is placed in the autoclave with 150 cm$^3$ of additional methanol (V$_M$=6.50 cm$^3$ g$^{-1}$; % H$_2$O=9.77). The heating rate of the autoclave is 100° C./hour. At the removal temperature of 270° C., the pressure is equal to 145 bars, that is to say a value distinctly greater than the critical values of the solvent. The solvent is removed in the same manner as in Example 1. The aerogel obtained in this case is in the form of a slightly opaque, cylindrical bar containing a certain number of small cracks.

The same result is obtained for any removal temperature between 260° and 290° C.

Another similar experiment is carried out, except that only 100 cm$^3$ of additional methanol are introduced into the autoclave (V$_M$=9.70 cm$^3$ g$^{-1}$). In this case, a bar containing very large cracks is obtained.

EXAMPLE 5

Preparation of a monolithic silica aerogel with prior ageing of the gel 13.4 cm$^3$ of pure methanol are added to 20 cm$^3$ of tetramethoxysilane. The mixture is agitated for 10 minutes. The amounts used correspond to 60% by volume of Si(OCH$_3$)$_4$ in CH$_3$OH. The hydrolysis of the tetramethoxysilane is carried out, with continuous agitation, by adding 9.8 cm$^3$ of distilled water. The duration of the hydrolysis is 30 minutes. The final solution is transferred into a tube made of a non-stick material (for example of polytetrafluoroethylene or polyethylene) and with a leaktight closure, and heated to 50° C. The gelling (solidification) of the solution does not take place until 15 hours later. The gel is then aged at the same temperature for 450 hours. When the ageing has ended, the gel is in the form of a transparent, bluish-colored cylindrical bar. The solvent is then removed from the autoclave in the manner described in Example 1. After drying, the gel is monolithic and bluish-colored and is much denser than that prepared in Example 1.

EXAMPLE 6

This example illustrates the influence of the ratio $$r = \frac{\text{number of moles of H}_2\text{O used}}{\text{number of moles of Si(OCH}_3\text{)}_4}$$

on the monolithic character of the aerogels obtained from starting methanol solutions containing various percentages by volume of Si(OCH$_3$)$_4$.

The general procedure is that of Example 1, except for the modifications indicated in the table which follows, which summarizes the data and the results obtained.

It is seen that, for the aerogels prepared from starting gellable mixtures containing a concentration of Si(OCH$_3$)$_4$ of the order of 40 to 50% by volume, all the aerogels obtained with a proportion of water of 4 to 6 moles/mole are monolithic. It is believed that the lower limit can drop at least to 2.5 moles/mole, since a satisfactory aerogel was obtained with this proportion of water for a concentration of Si(OCH$_3$)$_4$ equal to 60% by volume. As regards the upper limit, it is simply related to the appearance of immiscibility in the mixture. For higher concentrations of the order of 60% by volume, problems of immiscibility appear when r reaches 5. For the even higher concentrations of 70–80% by volume, it is no longer possible to obtain monoliths under the normal operating conditions, because of the problems of immiscibility. To overcome this, it is necessary to heat the gellable mixtures at 40°–60° C. for ½ hour to 1 hour with agitation. Another possibility is to carry out the hydrolysis, without heating, by means of a 0.001 to 0.005 N solution of mmonia.

TABLE

| % by volume of Si(OCH$_3$)$_4$ | r | VM cm$^3$g$^{-1}$ | % by weight of H$_2$O in the gel | Removal temperature of the solvent | Appearance of the aerogel | Monolithic character | Remarks |
|---|---|---|---|---|---|---|---|
| 40 | 4.65 | 3.05 | 8.3 | 275 | STB | M | |
| 40 | 6 | 3.05 | 8.3 | 275 | STB | M | |
| 50 | 4 | 3.27 | 10.6 | 268 | STB | M | |
| 50 | 4.65 | 3.40 | 11.4 | 275 | WO | M | |
| 50 | 6 | 3.27 | 10.6 | 268 | STB | M | |
| 60 | 2.5 | 3.40 | 10 | 268 | STB | M | |
| 60 | 3 | 3.40 | 10 | 268 | STB | M | |
| 60 | 4.65 | 3.40 | 10 | 268 | STB | M | |
| 60 | 5 | 3.40 | 10 | 268 | STB | M | initial immiscibility of the mixtures; need for homogenization by heating at 40° |
| 60 | 5 | 3.40 | 11.2 | 270 | STB + WO heterogeneous | | initial mixing without heating |
| 60 | 5.5 | 3.40 | 11.2 | 270 | STB + WO heterogeneous | | initial mixing without heating |
| 60 | 6 | 3.40 | 11.7 | 268 | STB + WO heterogeneous | | initial mixing without heating |
| 70 | 3 | 3.60 | 9.76 | 272 | STB heterogeneous | | initial mixing without heating |
| 70 | 3 | 3.60 | 9.76 | 270 | STB | M | hydrolysis with 0.005 N NH$_4$OH; no heating |
| 70 | 4.65 | 4.32 | 8.06 | 273 | STB | M | heating for one hour at 40° C. |
| 70 | 4 | 3.60 | 9.76 | 270 | TB (a few cracks at the bottom of the tube) | M | hydrolysis with 0.005 N NH$_4$OH; no heating |
| 80 | 2 | 3.5 | 7 | 275 | WO | C | *** |
| 80 | 2.5 | 3.5 | 7 | 275 | WO | C | *** |

***Initial mixture heated at 40° C., with agitation, until homogenization takes place; resulting gel is hard.
Meaning of the abbreviations:
TB: transparent, bluish
STB: slightly transparent, bluish
WO: white, opaque
M: monolithic
C: cracked

EXAMPLE 7

This example describes the preparation of a monolithic mixed SiO$_2$/B$_2$O$_3$ aerogel containing 5 mole % of B$_2$O$_3$.

49.1 cm$^3$ (68% by volume) of tetramethoxysilane, Si(OCH$_3$)$_4$, are mixed with 22.8 cm$^3$ of pure methanol. After homogenization of the mixture, the hydrolysis and the polycondensation of the organometallic are carried out with 26 cm$^3$ of distilled H$_2$O, an amount which corresponds to the stoichiometric amount for the hydrolysis of the mixture Si(OCH$_3$)$_4$+B(OCH$_3$)$_3$, that is to say 4 moles of water/mole of Si(OCH$_3$)$_4$+3 moles of water/mole of B(OCH$_3$)$_3$. The reaction is carried out for one hour, with agitation of the mixture, and it is not until this stage that 4.10 cm$^3$ of B(OCH$_3$)$_3$ are added to the mixture. The agitation is continued for a further 1 hour at ambient temperature (22°–25° C.

The final mixture is transferred into glass tubes with a leaktight closure. After ageing of the gel for 100 hours at 47° C. in an oven, the samples are covered with a small amount of pure methanol. They are then introduced into the autoclave. The amount of alcohol used for the hypercritical drying is equal to 260 cm$^3$ for the 1,000 cm$^3$ autoclave used. The heating rate of the autoclave is 1.6° C./minute. The removal of the solvent starts at 270° C. and its duration is 2 hours. After complete removal, the autoclave is purged with a dry gas, which can be N$_2$ or Ar. The aerogel is withdrawn from the autoclave after cooling. It is in the form of a cylindrical bar without cracks. It is transparent and slightly bluish.

A monolithic aerogel containing 5 mole % of B$_2$O$_3$ was also obtained in the case where the dilution of Si(OCH$_3$)$_4$ in the methanol was 40% by volume. In this case, the ageing time was about 120 hours.

EXAMPLE 8

This example describes the preparation of a monolithic mixed SiO$_2$/TiO$_2$ aerogel containing 10 mole % of TiO$_2$.

113.6 cm$^3$ of tetraethoxysilane, Si(OC$_2$H$_5$)$_4$, are mixed with 30 cm$^3$ of C$_2$H$_5$OH and 91.8 g of an ethanolic solution of Ti(OC$_2$H$_5$)$_4$ acidified with 4 cm$^3$ of concentrated HCl. The mixture is agitated for ½ hour. The hydrolysis is carried out with 36 cm$^3$ of distilled water at ambient temperature for ½ hour, with continuous agitation. After the hydrolysis, the mixture is transferred into tubes with a leaktight closure and placed in an oven at 50° C. After ageing for 9 days, the gel is covered with a small amount of ethanol and then placed in the autoclave; 310 cm$^3$ of pure ethanol are placed in the autoclave. The removal of the solvent is carried out at 280° C. and it lasts about 2 hours. When the removal has ended, the autoclave is purged as above. The aerogel withdrawn from the autoclave is monolithic and opaque and has a milky appearance.

EXAMPLE 9

This example illustrates the conversion of a monolithic silica aerogel to a silica glass.

The silica aerogel prepared in Example 1 is densified to form a glass in accordance with the following heat treatment.

The aerogel is heated to 650° C. at a rate of 50° C./hour; at this temperature, the aerogel only shows a very small shrinkage (1 to 2%). This heat treatment, the purpose of which is to remove any trace of organic groups, is carried out at atmospheric pressure for 10 hours. The aerogel is then heated to 1,160° C. at the same heating rate. After 30 minutes at this temperature, the material is completely transparent and possesses a density which is 99.5% of the density (2.20 g/cm$^3$) of the vitreous silica obtained by the classical method. The same aerogel can be densified to form a silica glass by heating at a rate of 300° C./hour. In this case, the material possesses a density equal to 2.2 g/cm³ at a temperature of 1,175° C.

EXAMPLE 10

This example also illustrates the conversion of a monolithic silica aerogel to a silica glass, but in accordance with a different programmed heat treatment.

According to this variant, the aerogel of Example 1 is heated to 500° C. at a rate of 50° C./hour; the gel is kept at this temperature for 15 hours. This treatment is carried out in an ambient atmosphere.

The gel is then heated to 950° C. under a primary vacuum, at the same heating rate, and kept at this temperature for ½ hour. The material is densified in vacuo at 1,215° C. for 10 minutes, after having been subjected to two isothermal treatments at 1,050° and 1,180° C. for 10 minutes. The material obtained has a density of 2.2 g/cm³ and possesses physical and mechanical properties similar to those of a vitreous silica obtained by the conventional method.

EXAMPLE 11

This example illustrates the conversion of a monolithic silica aerogel according to the invention to a heat-insulating material made of expanded silica.

A silica aerogel obtained as in Example 1 is subjected to rapid heating in vacuo ($10^{-1}$ mm Hg), so as to trap the oxidation products of the organic groups inside the material. This is effected by densifying of the surface and premature closing of the pores which come out at the surface. The final temperature is 1,280° C. The material possesses the same geometry as the starting aerogel, but its volume has increased by at least 1.5 times the initial volume. It is white and opaque and it possesses a very good mechanical strength. Its density is equal to 0.3 g/cm³. The porosity is entirely closed. Therefore, the material thus obtained constitutes a very good heat insulator.

We claim:

1. In a process for the preparation of a silica aerogel which is monolithic and free of fissures and cracks and has at least one of its dimensions greater than 10 cm, in which process water and a non-aqueous solvent are added to a hydrolyzable silicon compound, the amount of water being sufficient to hydrolyze and polycondense the said compound to form a gel, the silicon compound being present in an amount of at least 40% by volume, relative to the total of the silicon compound plus the non-aqueous solvent, the whole, placed in a container of the desired shape, is subjected, in an autoclave containing an additional amount of the non-aqueous solvent used to form the solution, to temperature and pressure conditions which are such that the critical point of the solvent of the solution remaining after gelling is exceeded, without the liquid/vapor equilibrium curve of the solvent being broken at any time, and the solvent and any residual water present are then removed in order to obtain a silica aerogel, the improvement wherein:
(a) the water and non-aqueous solvent are added to the hydrolyzable silicon compound in such amounts that the resultant solution is homogeneous;
(b) the autoclave treatment is carried out without the prior removal of water from the gel;
(c) the autoclave is heated at a rate of at least 50° C./hour to a temperature above the critical temperature, and once the desired maximum temperature has been reached, the solvent is removed under substantially isothermal conditions, over a period of at most 5 hours; and
(d) after the autoclave has returned to atmospheric pressure, the residual solvent is purged from the autoclave, the heating of the autoclave is stopped and the aerogel is withdrawn from the autoclave after cooling.

2. A process as claimed in claim 1, in which the silicon compound is tetramethoxysilane and the solvent of the non-aqueous solution is methanol, wherein:

the hydrolysis is carried out with an amount of water representing at most 1.5 times the stoichiometric amount;

the autoclave is heated to a temperature within the range from 265° to 275° C. and brought to a pressure of the order of 180 to 200 bars; and the treatment in the autoclave is carried out under conditions such that the volume per unit mass, $V_M$, is less than 6.5 cm³g⁻¹, in which $$V_M = \frac{\text{Useful internal volume of the autoclave under the critical conditions}}{\text{Mass of additional solvent + mass of solvent in the gel}}.$$

3. A process as claimed in claim 2, wherein:

the hydrolysis is carried out with an amount of water of between 1 and 1.25 times the stoichiometric amount;

the autoclave is heated at a rate of at least 100° C./hour;

the solvent is removed over a period of 2 to 3 hours; and the volume per unit mass, $V_M$, is between 3 and 4 cm³g⁻¹.

4. A process as claimed in any of claims 1 to 3, wherein a hydrolyzable alcoholate of boron, titanium or aluminum is present in addition to the silicon compound.

5. A process as claimed in claim 1, which further comprises the preparation of silica glass bodies or articles by the consolidation of the obtained aerogel by slow heating of the same to a temperature within the range of from 1,120° to 1,300° C.

6. A process as claimed in claim 5, wherein the heating is carried out over a period of 5 to 48 hours, with a holding time of 2 to 20 hours in the temperature range from 300° to 650° C., under an atmosphere of oxygen or air, in order to remove the residual organic groups, and optionally with the use of a drying treatment in order to remove the majority of the residual —OH groups.

7. A process as claimed in claim 1, which further comprises the production of a heat-insulating material by the rapid heating of the obtained aerogel to a temperature within the range of from 1,200° to 1,300° C.

8. A process of claim 4, which further comprises the preparation of silica glass bodies or articles by the consolidation of the obtained aerogel by slow heating of the latter to a temperature within the range of from 1,120° to 1,300° C.

9. A process as claimed in claim 8, wherein the heating is carried out over a period of 5 to 48 hours, with a holding time of 2 to 20 hours in the temperature range of from 300° to 650° C., under an atmosphere of oxygen or air, in order to remove the residual organic groups, and optionally with the use of a drying treatment in order to remove the majority of the residual —OH groups.

10. A process as claimed in claim 4, which further comprises the production of a heat-insulating material by the rapid heating of the obtained aerogel to a temperature within the range of from 1,200° C. to 1,300° C.

* * * * *

UNITED STATES PATENT AND TRADEMARK OFFICE
CERTIFICATE OF CORRECTION

PATENT NO. : 4,432,956
DATED : February 21, 1984
INVENTOR(S) : Jerzy W. Zarzycki, Michel Prassas and Jean E. H. Phalippou It is certified that error appears in the above—identified patent and that said Letters Patent is hereby corrected as shown below:

Col. 1, line 9; "areogels" (first occurrence) should read -- aerogels --

Col. 1, line 29; "nineral" should read -- mineral --

Col. 6, line 67; delete "25"

Col. 8, line 68; "mmonia." should read -- ammonia. --

Signed and Sealed this

First Day of January 1985

[SEAL]

Attest:

GERALD J. MOSSINGHOFF

Attesting Officer

Commissioner of Patents and Trademarks